United States Patent
Ziolko

[15] 3,688,343
[45] Sept. 5, 1972

[54] SHIRRING APPARATUS

[72] Inventor: Francis J. Ziolko, Somerville, N.J. 08876

[73] Assignee: Devro, Inc.

[22] Filed: June 22, 1970

[21] Appl. No.: 48,224

[52] U.S. Cl. .................................................17/42
[51] Int. Cl. ...........................................A22c 13/00
[58] Field of Search..........................................17/42

[56] References Cited

UNITED STATES PATENTS

| 1,761,189 | 6/1930 | Brennan et al. | 17/42 |
| 2,819,488 | 1/1958 | Gimbel | 17/42 |
| 2,604,657 | 7/1952 | Tipper | 17/42 |

*Primary Examiner*—Lucie H. Laudenslager
*Attorney*—James R. Hulen and Robert L. Minier

[57] ABSTRACT

A pair of angularly adjustable shirring rolls is mounted on each of two parallel rotatable shafts on opposite sides of a shirring mandrel over which a tube of material suitable for use as sausage casing is fed. The rolls are provided around the periphery thereof with tube-contacting teeth separated by grooves and each roll may be angularly adjusted on its shaft to align the teeth on the roll with the teeth or the grooves of the other rolls so that a variety of shirred tube configurations is obtainable.

3 Claims, 27 Drawing Figures

INVENTOR
FRANCIS J. ZIOLKO
BY
ATTORNEY

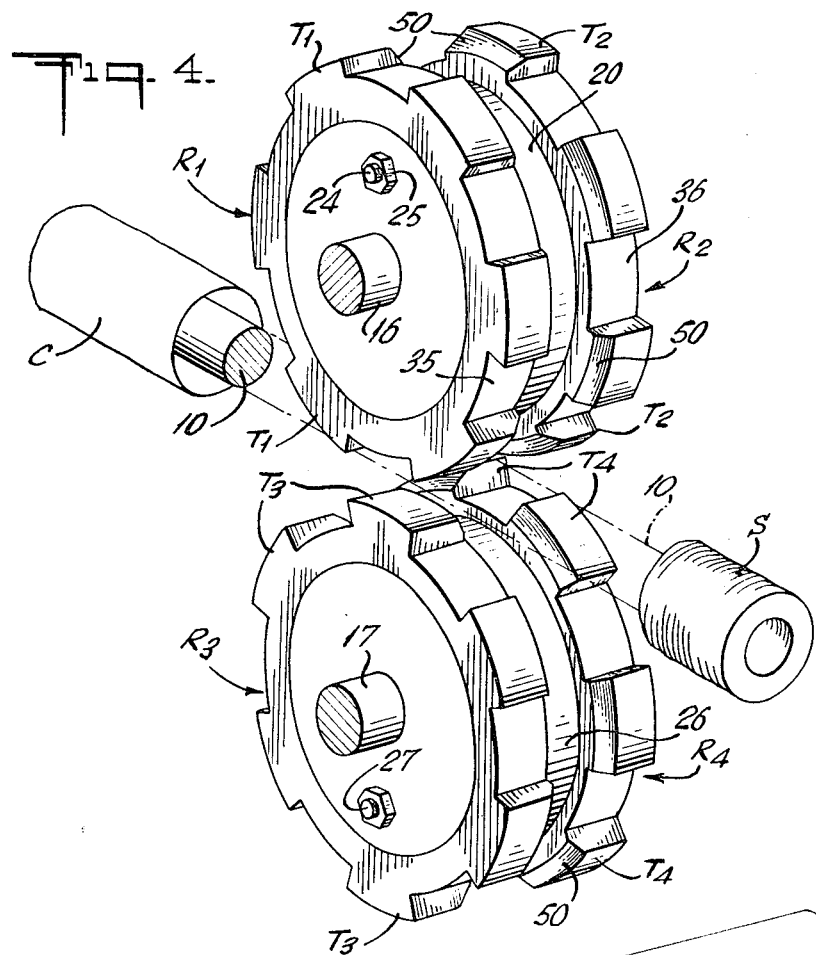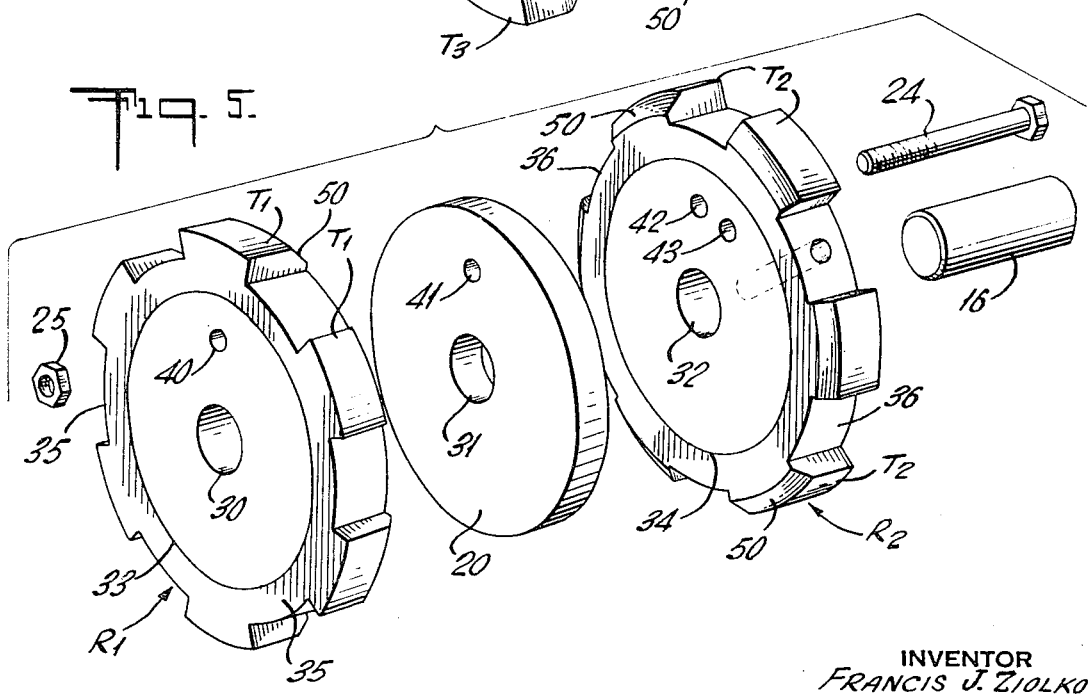

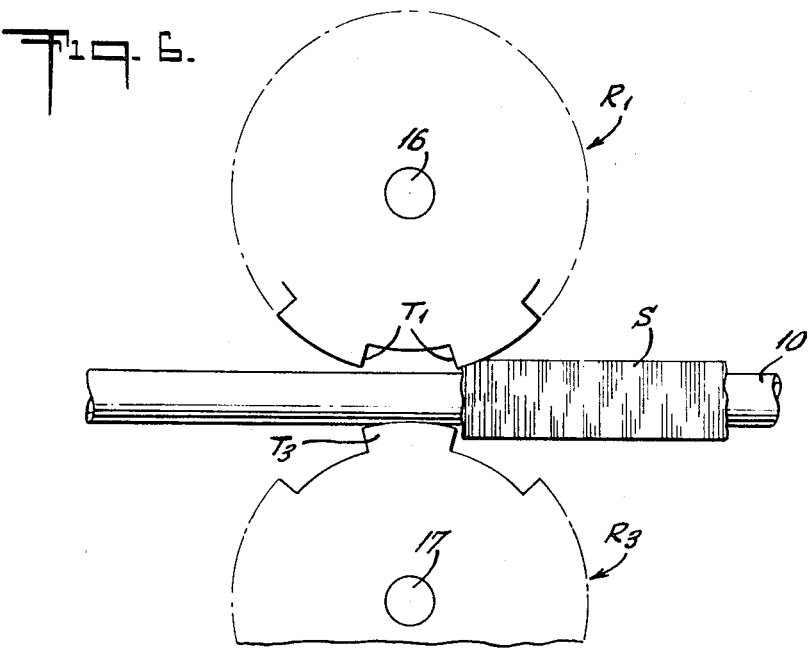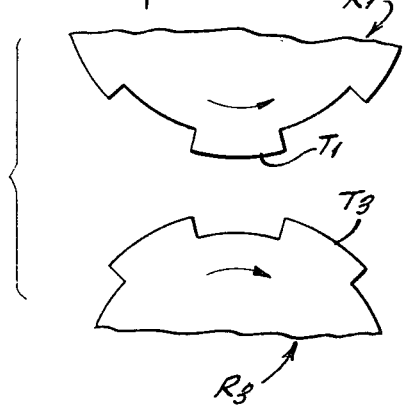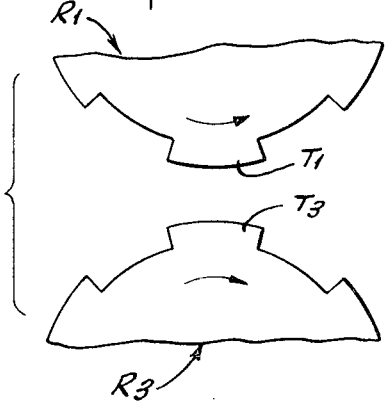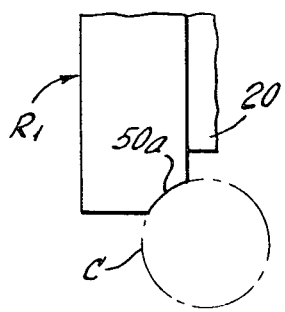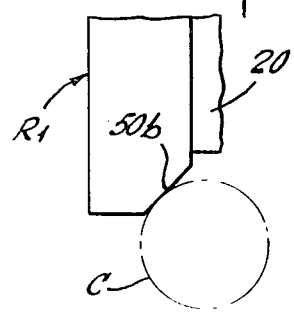

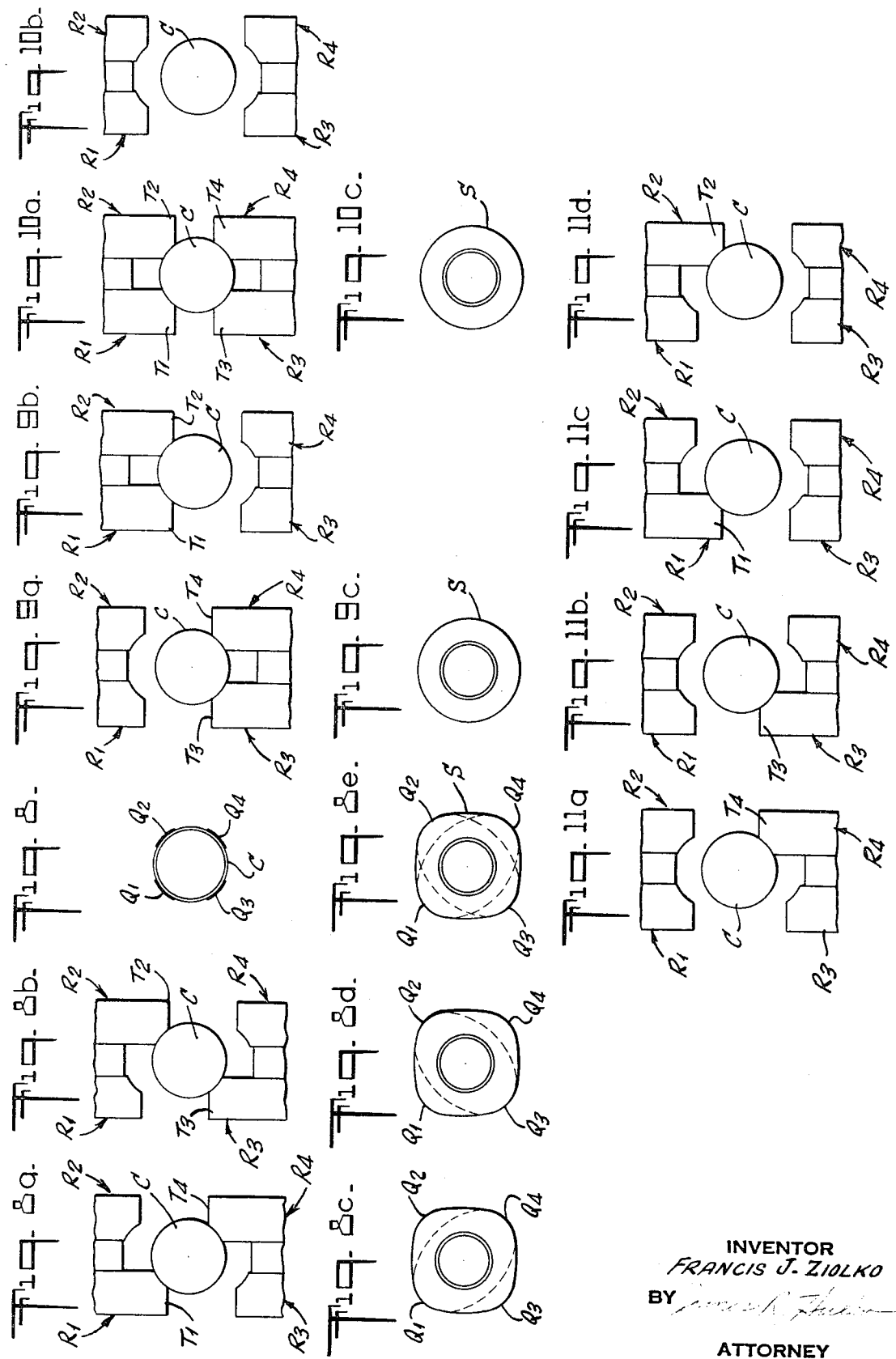

SHIRRING APPARATUS

BACKGROUND OF THE INVENTION

This invention relates to apparatus for shirring sausage casing and, more particularly, the invention relates to shirring rolls which may be conveniently adjusted to provide a variety of shirred tube configurations.

The manufacture of sausage casings from a continuous tubular body of casing material, for example, collagen, is fully described in U.S. Pat. No. 3,315,300, issued Apr. 25, 1967. For a general and detailed description of the apparatus used in and the method of manufacture of casings, and also for a particular description of apparatus for producing shirred and compressed lengths of casing from a continuous tube of extruded and dried collagen, reference is made to the above-cited patent, the disclosure of which is incorporated herein by reference.

The present invention is directed to an improvement in the shirring rolls which are generally identified in the aforementioned patent by the reference numerals 16 and 18.

Numerous prior devices have been designed to improve upon the tube shirring means and the shirred casing configuration resulting from the shirring operation, however, no device has heretofore provided the versatility and simplicity obtainable with the present invention.

SUMMARY OF THE INVENTION

It has been found that casing materials differ somewhat in their response to a shirring operation, therefore, it is desirable to adjust the frequency and location of the shirring action on the circumferential surface of the casing material in order to obtain the optimum shirr for a given casing material. This can best be done by selecting different shirring points around the circumference of the casing and providing tube-contacting surfaces on the shirring device that may be adjusted to contact the shirring points in accordance with a predetermined, optimum schedule during the passage of the casing through the shirring station of the apparatus.

The objects and advantages of the present invention are accomplished by providing two pair of shirring rolls having tube-contacting teeth separated by grooves around the periphery thereof. The two pair of rolls are mounted on opposite sides of a shirring mandrel over which a tubular casing material is fed. Each roll of the two pair of rolls is adapted to contact a different quadrant on the circumferential surface of the tube and each roll is angularly adjustable on its shaft in relation to the other rolls so that its teeth may be aligned with either the teeth or the grooves on the other rolls.

With the above-described structure, it will be readily apparent that a shirring device has been provided that is relatively simple in construction and, yet, is capable of producing a variety of high quality shirred tube configurations.

BRIEF DESCRIPTION OF THE DRAWINGS

FIG. 4 is a perspective view of the shirring rolls illustrating the position of the rolls relative to the shirring mandrel and the casing material;

FIG. 5 is an assembly drawing illustrating the relative position of the individual components of the shirring rolls prior to assembly on a rotatable shaft;

FIG. 6 is a schematic fragmentary side elevational view showing the position of the shirring rolls for one embodiment of the invention;

FIG. 6a is a schematic fragmentary side elevational view illustrating another embodiment of the invention;

FIG. 6b is a schematic fragmentary side elevational view illustrating still another embodiment of the invention;

FIG. 7 is an enlarged fragmentary view illustrating one configuration of the shirring roll tube-contacting surface;

FIG. 7a is a further embodiment illustrating another shirring roll tube-contacting surface;

FIG. 8 is a cross sectional view of a tube illustrating the roll-contacting surfaces which appear in four distinct quadrants on the circumference of the tube;

FIG. 8a is a schematic illustration of the relative position of the casing and the rolls for one embodiment of the invention;

FIG. 8b illustrates the embodiment of FIG. 8a during a subsequent angular position of the shirring rolls;

FIG. 8c illustrates the cross sectional configuration of a casing after it has been contacted by the rolls in the manner illustrated in FIG. 8b;

FIG. 8d illustrates the cross sectional configuration of a casing subsequent to being contacted in the manner illustrated in FIG. 8a;

FIG. 8e is a composite view illustrating the cross sectional configuration of the casing of FIGS. 8c and 8d;

FIGS. 9a and 9b illustrate a further embodiment of the invention and show the manner in which the casing is sequentially contacted by the shirring rolls;

FIG. 9c illustrates the cross sectional configuration of a casing shirred in the manner illustrated in FIGS. 9a and 9b;

FIGS. 10a and 10b illustrate still another embodiment of the invention and illustrate the manner in which the casing is sequentially contacted by the shirring rolls;

FIG. 10c illustrates the cross sectional configuration of a casing shirred in the manner illustrated in FIGS. 10a and 10b; and FIGS. 11a, 11b, 11c and 11d illustrate still another embodiment of the present invention and shows the manner in which the casing is sequentially contacted by the shirring roll.

DESCRIPTION OF THE PREFERRED EMBODIMENT(S)

As previously stated, the present invention is specifically directed to a unique shirring roll construction which is intended for use in a machine similar to that illustrated in U.S. Pat. No. 3,315,300. Although the shirring rolls will be described in conjunction with such a machine, it is not intended to limit this invention to the use of the shirring rolls with any specific apparatus.

Figure 1:
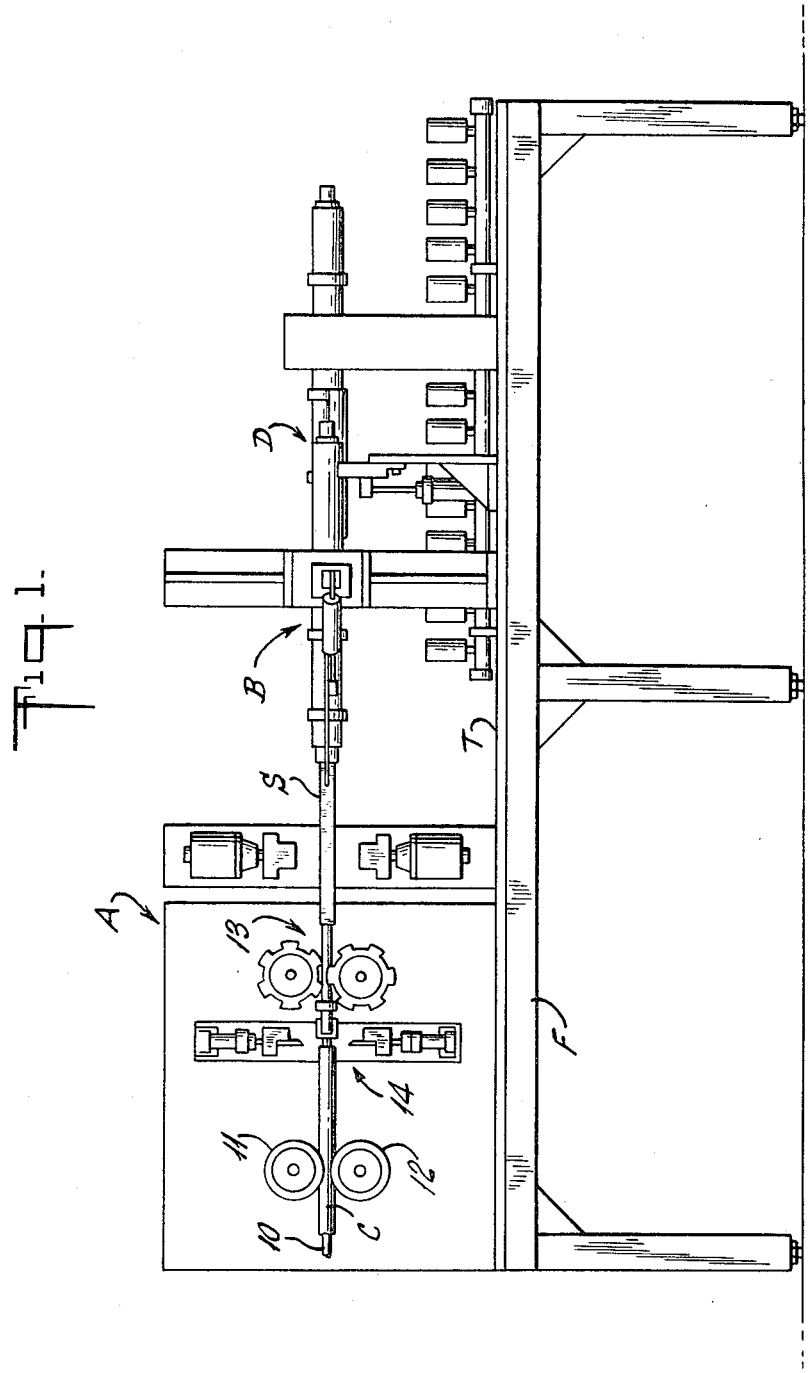
FIG. 1 is a side elevational view of the preferred shirring apparatus embodying the shirring rolls of the present invention.

Referring to FIG. 1, there is shown a shirring apparatus which, except for the shirring rolls, is identical to the apparatus illustrated in FIG. 4 of the above-cited U.S. Pat. No. 3,315,300. The apparatus generally comprises a shirring station A, a transfer and compression member B and an ejector member D, all of which are supported on a table T which is supported above the floor level by a frame construction F.

Figure 2:
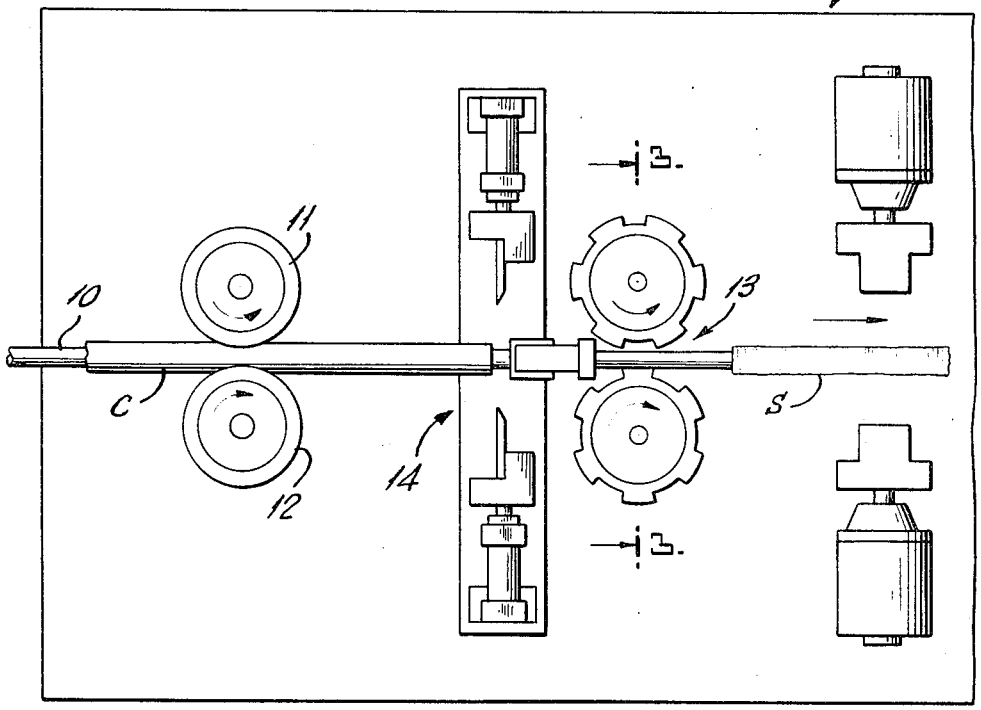
FIG. 2 is an enlarged view of the tube feeding and shirring station of the shirring apparatus.

The dried casing or tube material C is fed over the shirring mandrel 10 by a pair of feed rolls 11 and 12 into the shirring station A where it is shirred into a shirred section S, which is further manipulated by members B and D as described in U.S. Pat. No. 3,315,300. Referring to FIG. 2, shirring station A is shown in an enlarged view wherein dried casing C is shown in position over shirring mandrel 10. The casing or tube C is fed toward the shirring rolls shown generally at 13 wherein the casing is brought into position between shirring rolls 13 and subjected to the tube-contacting surfaces of the rolls which shirr the casing into the shirred portion S. A pair of vertically actuated knives shown generally at 14 provide means for severing the shirred casing into individual sections after an appropriate length of casing C has been shirred.

Figure 3:
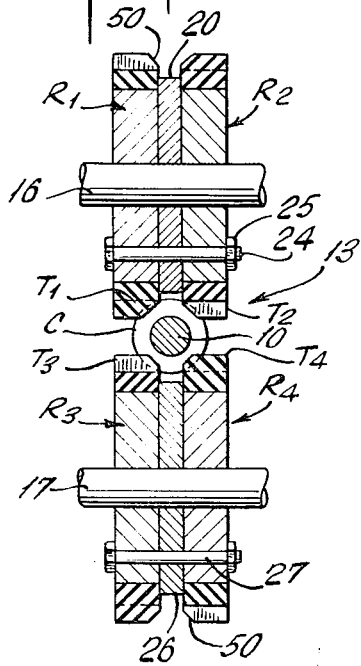
FIG. 3 is a cross sectional view taken along line 3—3 in FIG. 2.
Figure 3A:
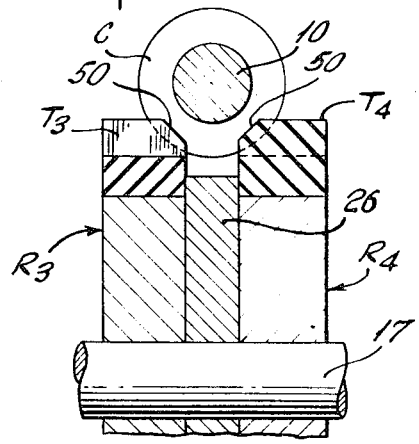
FIG. 3a is an enlarged fragmentary view illustrating the view of FIG. 3 with the top rolls broken away for clarity.

As stated above, the essence of the subject invention is the construction and operation of the shirring rolls 13 which will now be described in detail. Referring to FIGS. 3 and 3a, the shirring rolls 13 actually comprise four individual rolls $R_1$, $R_2$, $R_3$ and $R_4$. These rolls are mounted on two parallel shafts 16 and 17 which are rotatably mounted on opposite sides of shirring mandrel 10. The shafts 16 and 17 are substantially parallel during the shirring operation and are mounted to be pivoted away from the mandrel so that transfer and compression member B may move severed sections of the shirred casing away from shirring station A. The manner in which shafts 16 and 17 are driven and manipulated is described in detail in U.S. Pat. No. 3,315,300. Rolls $R_1$ and $R_2$ form a pair of rolls mounted on shaft 16 and the rolls are held in spaced relation on the shaft by a spacer disk 20 which determines the spaced circumferential locations on casing C at which the tube-contacting surfaces $T_1$ and $T_2$ of rolls $R_1$ and $R_2$, respectively, make contact with tube C. Rolls $R_1$ and $R_2$ and spacer disk 20 are secured together for uniform rotation by a locking bolt 24 and nut 25. In a similar manner, rolls $R_3$ and $R_4$ form a second pair of shirring rolls which are mounted on shaft 17 and which are held in a predetermined spaced position by a second spacer disk 26. Rolls $R_3$ and $R_4$ and spacer disk 26 are held against relative angular displacement by a locking bolt 27 which passes through apertures in the three members.

A detailed assembly drawing illustrating the manner in which the rolls and the spacer disks are mounted relative to each other and relative to the rotatable shafts is shown in FIG. 5. Since the two pairs of rolls are essentially identical in construction only a detailed description of one of the pairs is shown in FIG. 5 for purposes of clarity.

Roll $R_1$, spacer disk 20 and roll $R_2$ are provided with central apertures 30, 31 and 32, respectively, through which shaft 16 is passed and secured. Rolls $R_1$ and $R_2$ are preferably constructed with metallic center disks 33 and 34, respectively, and outer elastomeric tube-contacting portions 35 and 36, respectively. The preferred material usable for tube-contacting portions 35 and 36 is a relatively firm elastomeric material and 50 durometer polyurethane has been used successfully for these portions.

An important aspect of the subject invention is the angular adjustability of rolls $R_1$ and $R_2$ relative to each other on shaft 16. The purpose for this adjustability will be described in further detail hereinbelow, however, the manner in which the angular adjustment is obtained will now be described. As stated hereinabove, rolls $R_1$ and $R_2$ and spacer disk 20 are held against angular displacement relative to one another by locking bolt 24 which passes through the three members. Roll $R_1$ is provided with a bolt receiving aperture 40, spacer disk 20 is provided with a bolt receiving aperture 41 and roll $R_2$ is provided with a pair of bolt receiving apertures 42 and 43. It will be apparent from this construction that structure is provided for adjusting the angular position of roll $R_2$ relative to the angular position of roll $R_1$ and spacer disk 20. This may be accomplished by passing bolt 24 through either aperture 42 or 43 in roll $R_2$. Roll $R_2$ is also provided with a radially extending aperture 44 through which a suitable set screw (not shown) may be passed to secure both rolls and the spacer disk against angular displacement relative to shaft 16. Although a pair of axially extending apertures 42 and 43 are shown in roll $R_2$, it is also possible to provide additional apertures so that more than two angular positions may be accomplished with respect to the two rolls $R_1$ and $R_2$.

The actual tube-contacting surfaces are illustrated in the preferred embodiment as teeth $T_1$ and $T_2$ extending radially around the periphery of tube-contacting portions 35 and 36, respectively, (see FIGS. 4 and 5). As stated above, the second pair of rolls $R_3$ and $R_4$ are constructed identical to rolls $R_1$ and $R_2$, and, therefore, are also provided with radially extending teeth $T_3$ and $T_4$, respectively, which form the tube-contacting surfaces for the rolls.

The inner edges of the teeth, namely, those edges adjacent to spacer disks 20 and 26, are beveled slightly as at 50 in FIG. 5 so that the rolls will contact the casing material in a substantially tangential plane during the shirring operation. FIGS. 7 and 7a represent two beveled constructions for the inner edges of the teeth and also show the position at which each tooth contacts the tubing material during the shirring operation. In FIG. 7, the beveled portion 50a is slightly concave to conform to the circumference of the casing C and, in FIG. 7a, bevel 50b is formed substantially tangential to the circumference of casing C. With either construction, it should be noted that the tube-contacting surfaces of the teeth are contacting the casing material in a line that is substantially tangential to the casing even though the rolls are mounted on shafts that are substantially perpendicular to the axis of the casing material.

Although the precise dimensions of the tube-contacting teeth are not critical, it has been found to be desirable to utilize approximately six teeth around the circumference of each roll, adjacent teeth being circumferentially spaced by grooves having a circumferential length substantially equal to that of each tooth.

In order to better understand the invention, reference is now made to FIG. 8 of the drawings wherein a sausage casing material C is illustrated in cross section. It will be observed that the dried casing, which is generally circular in cross sectional configuration, is divided into four distinct roll-contacting quadrants $Q_1$, $Q_2$, $Q_3$ and $Q_4$. Because of the unique arrangement of the shirring rolls, each roll is designed to make contact with one of the four quadrants during the rotation of the rolls.

Although it is feasible to utilize solid tube-contacting surfaces on the shirring rolls, it has been found to be much more desirable to break the surface and, more specifically, to utilize the spaced tooth arrangement described hereinabove. Furthermore, it has also been found to be desirable to alternate the contact between the rolls and the casing at any particular time so that the casing will be freely drawn into the desired shirred construction. By way of example, referring to FIG. 4, the perspective view therein illustrated depicts the positions of both pair of rolls at a single contact point on the tube, wherein roll $R_1$ is angularly positioned on shaft 16 relative to roll $R_2$ so that a space or groove between teeth $T_1$ is directly adjacent the casing material C. At the same time, a tooth $T_2$ on roll $R_2$ is contacting the casing and thereby causing a shirring action to occur in quadrant $Q_2$. Likewise, the other pair of rolls $R_3$ and $R_4$ which are positioned on shaft 17 are angularly positioned so that a tooth $T_3$ is in contact with the casing material C to cause a shirring action in Quadrant $Q_3$ and a groove between teeth $T_4$ is positioned adjacent the casing so that no shirring action will occur in quadrant $Q_4$. The operation of the shirring rolls in this manner and the shirred tube configuration created thereby is schematically illustrated in FIGS. 8a through 8e. Referring first to FIG. 8b, the position of the roll therein depicted is identical to the position of the rolls in the FIG. 4 illustration. Tooth $T_2$ is in contact with tube C in quadrant $Q_2$, and tooth $T_3$ is in contact with the casing material in quadrant $Q_3$. During this position of the rolls, the casing will be contacted by teeth $T_2$ and $T_3$ and the material contacted thereby will be drawn into a configuration similar to that shown in FIG. 8c. Similarly, after both pairs of rolls have partially rotated, teeth $T_1$ and $T_4$, as shown in FIG. 8a, will come into contact with quadrants $Q_1$ and $Q_4$, respectively, to result in a casing configuration as depicted in FIG. 8d. FIG. 8e illustrates the "square" composite configuration of FIGS. 8c and 8d which will ultimately result in the shirred casing S after an entire length of casing has passed between the pairs of shirring rolls.

It will be apparent from the foregoing that the shirring roll construction of the present invention provides a unique procedure for not only manufacturing high quality shirred casing but also a unique means for rapidly and easily varying the configuration of such casing. In FIGS. 6 through 6b, some of the various positions of the opposed rolls are schematically illustrated. In FIG. 6, roll $R_1$, which is opposed to roll $R_3$, is positioned relative to shaft 16 so that a groove between teeth $T_1$ is adjacent to the casing material at the same time that a tooth $T_3$ on roll $R_3$ is in contact with the casing material. FIG. 6a illustrates the reverse of FIG. 6, and FIG. 6b illustrates the tooth $T_1$ directly in alignment with tooth $T_3$ at any point in time. For the purpose of describing and claiming this invention, the term "aligned" will be used to describe the position of the teeth on different rolls relative to each other at the point of contact on tube C. For example, in FIG. 6, tooth $T_3$ is shown in a tube-contacting position, whereas, teeth $T_1$ are not in a tube-contacting position. Therefore, tooth $T_3$ on roll $R_3$ is "aligned" with a groove on roll $R_1$. In a like manner, in FIG. 6a, tooth $T_1$ is "aligned" with a groove on roll $R_3$. On the other hand, in FIG. 6b, tooth $T_1$ on roll $R_1$ is "aligned" with tooth $T_3$ on roll $R_3$.

In order to further demonstrate the versatility of the shirring roll construction of this invention, reference is made to FIGS. 9a through 9c wherein a further embodiment of the invention is illustrated. In the FIG. 9a illustration, teeth $T_3$ and $T_4$, which contact adjacent quadrants $Q_3$ and $Q_4$ at the point of contact with tube C, are in alignment with each other, but both of the teeth are in alignment with the grooves on rolls $R_1$ and $R_2$. On the other hand, during a subsequent partial rotation of both pairs of rolls, teeth $T_1$ and $T_2$ will move into contact with tube C, as shown in FIG. 9b, and will be in alignment with one another and they will also be in alignment with the spaces or grooves on rolls $R_3$ and $R_4$. The shirred tube resulting from such a relative angular relationship between the rolls, is illustrated in FIG. 9c as an annular configuration. It will, therefore, be apparent from the foregoing, that in order to change from the "square" casing configuration illustrated in FIG. 8e to the annular configuration illustrated in FIG. 9c, it is only necessary to alter the relative angular position of the rolls on shafts 16 and 17 so that the alignment of the teeth and grooves is altered accordingly.

In a further embodiment, all four rolls have their teeth $T_1$, $T_2$, $T_3$ and $T_4$ aligned at the point of contact with the tube as illustrated in FIG. 10a. It can also be said, as illustrated in FIG. 10b, that for the same embodiment the grooves or spaces between the teeth on all four rolls are also aligned during a subsequent partial rotation of the rolls. The product produced by the FIGS. 10a and 10b embodiment is illustrated in FIG. 10c as an annular shirred tube configuration. The annular configurations obtained in FIGS. 9c and 10c result from the relatively symmetrical contact between the shirring teeth and the casing. Whereas, the "square" construction obtained in FIG. 8e results from the contact of the diametrically opposed shirring teeth.

FIGS. 11a through 11d schematically represent a further tooth arrangement which can be accomplished by omitting certain teeth around the periphery of the four shirring rolls. Since contact between the shirring rolls and the casing material C occurs sequentially in only one quadrant at a time, it is necessary that the grooves between the teeth on each roll be larger than the grooves previously discussed and illustrated in the other embodiments. For example, in FIG. 11a tooth $T_4$ is in contact with quadrant $Q_4$ during one position of the shirring rolls. Similarly, the remaining quadrants $Q_3$, $Q_1$ and $Q_2$, are contacted in clockwise order by teeth $T_3$, $T_1$ and $T_2$, respectively, as the rolls are rotated sequentially.

It will be apparent from the foregoing that a large variety of shirred tube configurations is obtainable with the adjustable shirring roll construction described hereinabove and it is not intended to be limited by the specific embodiments described herein.

What is claimed is:

1. In an apparatus for shirring a continuous tube of material suitable for use as a sausage casing, a shirring mandrel, means for feeding said tube over said mandrel, a rotatable shaft mounted approximately 90° to the axis of said mandrel, a pair of shirring rolls mounted on said shaft, said rolls having spaced tube-contacting surfaces around the periphery thereof for contacting adjacent circumferential quadrants of said tube, a second rotatable shaft mounted substantially parallel to said first shaft on the side of said mandrel opposite to said first shaft, a second pair of shirring rolls mounted on said second shaft, said second pair of rolls having spaced tube-contacting surfaces around the periphery thereof for contacting the other adjacent circumferential quadrants of said tube, and means for adjusting the relative angular position of said rolls on said shafts.

2. The apparatus of claim 1 wherein said tube-contacting surfaces are radially extending teeth separated by grooves.

3. In an apparatus for shirring a continuous tube of material suitable for use as a sausage casing, a shirring mandrel, means for feeding said tube over said mandrel, a rotatable shaft mounted approximately 90° to the axis of said mandrel, a pair of shirring rolls mounted on said shaft, said rolls having spaced tube-contacting surfaces around the periphery thereof for contacting adjacent circumferential quadrants of said tube, a spacer disk disposed between said rolls for determining the spaced circumferential points on said tube to be contacted by said rolls, and adjusting means comprising a locking bolt which extends through apertures in said rolls and said spacer disk, at least one of said rolls having a plurality of apertures for adjusting the relative angular position of said rolls on said shaft.

* * * * *